United States Patent [19]

Lu et al.

[11] Patent Number: 4,865,422
[45] Date of Patent: Sep. 12, 1989

[54] GLARE-PROOF INSIDE REAR VIEW CAR MIRROR

[76] Inventors: Chih-Hsiung Lu, 4th Fl, No. 5, lane 306 Kung Kuan Road, Peitou, Taipei, Taiwan; Jill H. Lu, 807 Manley Dr., San Gabriel, Calif. 91776

[21] Appl. No.: 199,427
[22] Filed: May 27, 1988
[51] Int. Cl.⁴ .......................... B60R 1/04; G02B 5/04
[52] U.S. Cl. ..................................... 350/281; 350/637
[58] Field of Search ............................. 350/281, 637

[56] References Cited

U.S. PATENT DOCUMENTS 2,616,335 11/1952 Mazur ................................. 350/281

*Primary Examiner*—Bruce Y. Arnold
*Assistant Examiner*—Rebecca D. Gass

[57] ABSTRACT

A glare-proof inside rear view mirror is provided with a glare-reducing angle adjuster by forming two recesses in an indentation formed on a lower edge of the adjuster and forming two bifurcate arms on a bifurcate bar for rotatably engaging the two recesses of the indentation whereby upon a rotation of the bifurcate bar the inside rear view mirror can be angularly adjusted for a two-stage reduction of the glass reflected from the rear view mirror. A supporting brace secured with the rear view mirror can be formed with two segments which are pivotally connected with each other and can be operated as driven by a DC motor for adjusting a bending angle between the two segments for optionally orienting the rear view mirror for anti-glare purpose.

2 Claims, 2 Drawing Sheets

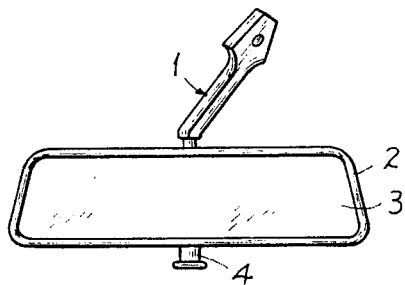
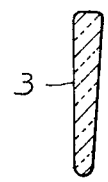
FIG.1 PRIOR ART  FIG.2 PRIOR ART
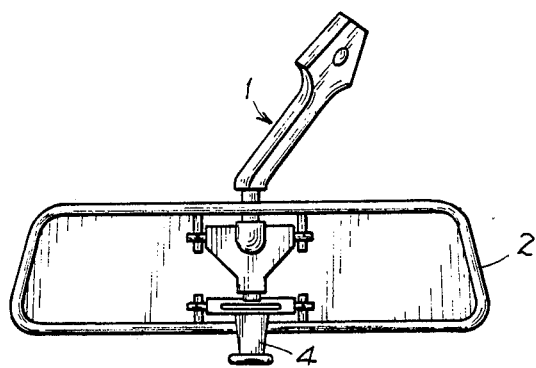
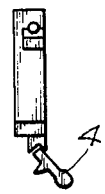
FIG.3 PRIOR ART  FIG.4 PRIOR ART
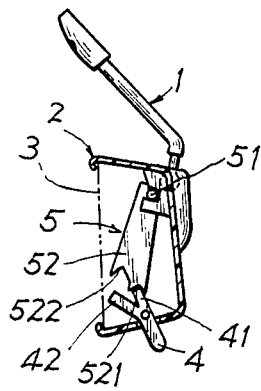
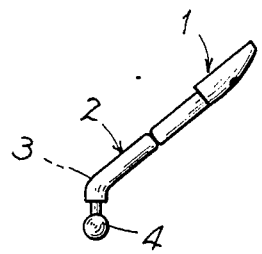
FIG.5  FIG.6

GLARE-PROOF INSIDE REAR VIEW CAR MIRROR

BACKGROUND OF THE INVENTION

When driving a car, judging the traffic conditions to the rear is completely dependent on the rear view mirrors. At night the inside rear view mirror currently in use often reflects bright objects directly into the eyes, especially when cars behind are using their high beams. This tends to make drivers very uncomfortable, tense or nervous and affects their judgement of distance jeopardizing safety.

Vehicles nowadays are all equipped with conventional rear view mirrors which are made by using a wedge-shaped glass with the thicker edge on the top and the thinner edge on the bottom (see FIGS. 1 and 2). These rear view mirrors have a feature which allows the driver to reduce the amount of the glare by changing its reflecting angle either upwardly or downward. This feature cuts down much of the glare, but it is still often not enough. Under certain conditions at night such as anytime another vehicle is driving too close behind with high beams on (because the intensity of light is in inverse proportion to the square of the distance from the light source), this change of the mirror's reflecting angle still does not reduce the glare enough to eliminate the discomfort or hazard. This is potentially very dangerous, especially when the vehicle keeps on following at the same distance. In order to remedy this condition, this invention was designed to improve upon the function of the mirror currently in use. It incorporates an additional glare-reducing mechanism producing a second stage glare-reducing effect which eliminates the glaring brightness that the conventional rear view mirrors cannot.

An automatic inside rear view mirror is used on the most recent models of Cadillac (General Motor Cooperation, U.S.A.), which consists of a photocell, sensitivity dial, on-off switch, probable a DC motor, etc. Although it is more convenient and useful than the manual one, it also has a disadvantage, namely, it sometimes jeopardizes safety, especially just before turning when there is a combination of cars behind with high beams and with low beams, in which case, the photocell being activated by the high beams, the low beams become too faint to be seen clearly. Although it has an on-off switch, it is difficult to manipulate in a hurry under such conditions. Moreover, unlike our new design it has only one stage rather than two stages of glare-reducing effect.

SUMMARY OF THE INVENTION

This new glare-proof inside rear view mirror modifies the glare-proof rear view mirror presently used by adding a newly designed angle converter (see FIG. 5) which changes the mirror's reflecting angle in two consecutive sequences (stages) instead of just one. Thus the glare-proof inside rear view car mirror has two glare-reducing adjustments rather than only one (since the conventional rear view mirror uses wedge-shaped glass the more the reflecting angle is changed the dimmer the reflected light).

An even more convenient way to change the reflecting angle of the presently-used rear view mirror would be to control it selectively using 3 buttons installed near the dashboard. This alternate system consists of a modified two-segmented supporting brace connected by a joint, a DC motor, a pair of bevel gears, a cam disk, a micro-switch (see FIG. 9), and a specially designed circuit board. Two different pre-adjusted angulations (reflecting angles) of the supporting brace can be produced by activating the DC motor, which drives the bevel gears to move the joint. The cam disk and the microswitch control how much the motor will rotate.

BRIEF DESCRIPTION OF THE DRAWINGS

FIG. 1. A front view of a conventional rear view mirror.

FIG. 2. A side view showing the tapered appearance of the glass used in the conventional rear view mirror.

FIG. 3. A front view of the conventional rear view mirror when the mirror glass had been removed showing the appearance, location, and relationship of the so-called "angle converter" and the "angle converter switch".

FIG. 4. A side view of the angle converter and its switch of the conventional rear view mirror.

FIG. 5. A side view of the newly designed angle converter its two indentations at the lower edge and its relationship to the corresponding transverse bars of the present invention.

FIG. 6. A side view of the mirror's modified supporting brace of the present invention, which is made of two short segments connected by a joint, having a normally straight alignment.

DESCRIPTION OF THE PREFERRED EMBODIMENT

Figure 7:
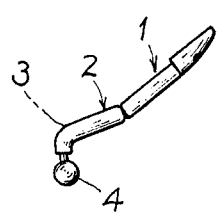
FIG. 7. A side view of the modified supporting brace of the mirror set at its 1st glare-reducing stage with approximately 5 degrees angulation at the joint in accordance with the present invention.

Conventional glare-proof inside rear view mirrors presently used in cars are made by using a wedge-shaped glass 3 with the thicker edge on the top and the thinner edge on the bottom. When a light source projects directly into it from a short distance away, multiple reflections of various intensity are found within the mirror arranged from top to the bottom in the order of bright, brightest, bright, dim, dimmer, etc. When driving at night, the conventional glare-proof rear view mirror produces its glare-reducing effect by changing the mirror's reflecting angle either upwardly or downward, so that either the upper or the lower of the "bright" reflections rather than the "brightest" one strikes the eyes. However as mentioned above there are still many occasions in night driving when even this improved reflection is too bright (glaring). The new system improves upon the former one by providing an additional change of angle upwardly, so that the reflection which strikes the eyes is the first of the dim reflections (4th from the top). This effectively eliminates the brightness problems of very high glare situations which the former system does not solve.

An angle adjuster 5 to change the mirror's reflecting angle formed in a frame 2 of a mirror glass 3 of the present invention is provided with a pivoting means 51 on its top portion pivotally secured to the mirror frame 2 and universally secured to the supporting brace 1 and with an indentation 52 at its lower edge, which dovetails with the bifurcate bar attached to the switch, (we call it the angle-adjusting switch 4, see FIGS. 3 and 4), that the driver uses to change the mirror's reflecting angle. By doubling the indentation 52 to form a first recess 521 and a second recess 522 positioned slightly above the first recess 521 and by forming the bifurcate bar of the switch 4 to have a first arm member 41 engageable with the first recess 521 and a second arm member 42 engageable with the second recess 522 of the indentation 52 (see FIG. 5), a 2nd adjustment to further change the mirror's reflecting angle can be made to eliminate the very high glare problems which the former mirror does not solve.

In general, the new glare-proof rear view mirror has the same appearance as the conventional rear view mirror presently used, except for a wider range of motion for the angle converter switch and a somewhat thicker frame needed to enclose the larger angle converter.

A more convenient way to change the reflecting angles of the presently-used rear view mirror would be to control it selectively using 3 pushbuttons (for neutral position, 1st stage, and 2nd stage respectively) installed near the dashboard in accordance with the present invention. This alternate system makes use of two different pre-adjusted angulations on its supporting brace to change the mirror's reflecting angle rather than the previously mentioned angle converter. The modified supporting brace 1 of the button-controlled mirror comprises two short segments 1a, 1b connected by a joint 6 (see FIG. 6), a DC motor 7, a pair of bevel gears 9, 9a, a cam disk 10, a microswitch 11 (see FIG. 9), and a control circuit means including the three pushbuttons for operating the motor 7.

Figure 8:
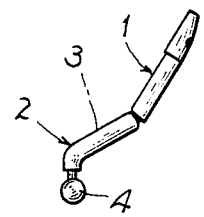
FIG. 8. A side view of the modified supporting brace of the mirror set at its 2nd glare-reducing stage with approximately 11 degrees angulation at the joint of the present invention.
Figure 9:
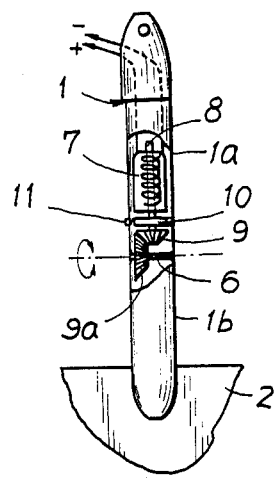
FIG. 9. A top view illustration of the modified support brace of the mirror showing the interior details of the proximal hollow-cored segment and joint with the cam disc located at the distal part of the motor's axis right next to the bevel gear of another preferred embodiment of the present invention.

The angle (angulation) of the supporting brace 1 can be altered by activating the DC motor 7 (installed inside a proximal hollow segment 1a) to drive the bevel gears 9, 9a, of which an upper bevel gear 9 is attached to a motor shaft 8, and a lower bevel gear 9a is fixed at the joint 6 securing a distal hollow segment 1b pivotally secured to and positioned under the upper proximal segment 1a, (see FIG. 9). The cam disk 10, which can be attached on the motor shaft 8 adjacent to the bevel gear 9 (see FIG. 9), adjusts the angulation (angle) between the two segments 1a, 1b by stopping the motor 7 when it actuates the microswitch 11 while rotating. In the normal (non-glare) condition the two segments 1a, 1b are in a straight alignment. Upon a depression of the 1st stage (low glare) button the motor 7 is driven to rotate the gears, the lower segment 1b and the mirror 3 at an angle of approximately 5 degrees (see FIG. 7), and the 2nd stage (high glare) button, a further 6 degrees as shown in FIG. 8 will be rotated. While depressing the neutral (non-glare) button, the motor 7 is reversely rotated to straighten the two segments 1a, 1b as shown in FIG. 6.

We claim:

1. A glare-proof inside rear view car mirror comprising: a supporting brace having an upper end portion secured to a car and having a lower end portion protruding downwardly; and an angle adjuster formed in a frame of a mirror glass of the inside rear view mirror having a pivoting means formed on a top portion of the angle adjuster pivotally secured to an upper edge of the frame of the mirror glass and universally secured to said lower end portion of said supporting brace, an indentation formed on a lower portion of the adjuster having a first recess formed on a lower edge of said indentation and a second recess adjacent to said first recess positioned slightly above said first recess, and a bifurcate bar pivotally mounted on a lower edge of the frame of the mirror glass having a first arm member rotatably engageable with said first recess of said indentation and a second arm member bifurcated from said first arm member to be higher than said first arm member rotatably engageable with said second recess of said indentation, whereby upon a rotation of said bifurcate bar of said angle adjuster to rotate said indentation about said pivoting means for a stepwise engagement between a recess of the indentatiion and an arm member of the bifurcate bar, said rear view mirror can be angularly adjusted for a two-stage reduction of glare as reflected from said rear view mirror.

2. A glare-proof inside rear view mirror comprising:
a supporting brace having an upper end portion secured to a car and having a lower end portion pivotally secured with a frame for mounting a rear view mirror thereon;
the improvement which comprises:
said supporting brace including an upper hollow segment and a lower hollow segment pivotally secured to said upper hollow segment by a joint;
a direct-current motor secured in said upper hollow segment having a motor shaft therein;
an upper bevel gear secured on a lower end of said motor shaft;
a lower bevel gear secured on said joint secured with said lower segment, engageable with said upper bevel gear;
a cam disk mounted on said motor shaft above said upper bevel gear;
a microswitch formed on said upper segment operatively actuated by said cam disk for stopping said motor; and
a control circuit means including a first-stage pushbutton operatively depressed for rotating the motor, the bevel gears, the lower segment and the rear view mirror a first angle for primarily reducing glare reflected from the mirror, a second-stage pushbutton operatively depressed for further rotating said lower segment and mirror a second angle for secondarily reducing the glare, and a neutral pushbutton operatively depressed for reversely rotating said motor for straightening said two segments for recovering said rear view mirror towards its non-glare position.

* * * * *